United States Patent [19]
Chiu et al.

[11] Patent Number: 6,031,931
[45] Date of Patent: Feb. 29, 2000

[54] AUTOMATED VISUAL INSPECTION APPARATUS

[75] Inventors: Chinchuan Chiu, New City, N.Y.; Philip Paolella, Waldwick, N.J.; Michael Leary, Penn Hills, Pa.; Joseph A. Marcanio, Greensburg, Pa.; Fusao Ishii, Pittsburgh, Pa.

[73] Assignees: Sony Corporation, Tokyo, Japan; Sony Electronics, Inc., Park Ridge, N.J.

[21] Appl. No.: 08/615,474

[22] Filed: Mar. 15, 1996

[51] Int. Cl.⁷ .................... G06K 9/00; G06K 9/48
[52] U.S. Cl. ................ 382/141; 382/145; 382/147; 382/199
[58] Field of Search ..................... 382/199, 147, 382/141; 313/402; 348/92, 125, 128; 356/507, 237, 384, 430, 106

[56] References Cited

U.S. PATENT DOCUMENTS

| | | | |
|---|---|---|---|
| 4,930,889 | 6/1990 | Van Donselaar et al. | 356/237 |
| 5,081,689 | 1/1992 | Meyer et al. | 382/199 |

*Primary Examiner*—Jose L. Couso
*Assistant Examiner*—Duy M. Dang
*Attorney, Agent, or Firm*—Frommer, Lawrence & Haug, LLP.; William S. Frommer

[57] ABSTRACT

Apparatus for determining at least one edge of an object having a plurality of openings with respective edges. An imaging device generates an image signal of the object to represent light intensity values of a plurality of pixels, the image signal being processed to estimate a linear relationship derived from the light intensity values of a predetermined number of the pixels. A determining device determines whether the linear relationship includes at least one light intensity value corresponding to an edge.

31 Claims, 11 Drawing Sheets

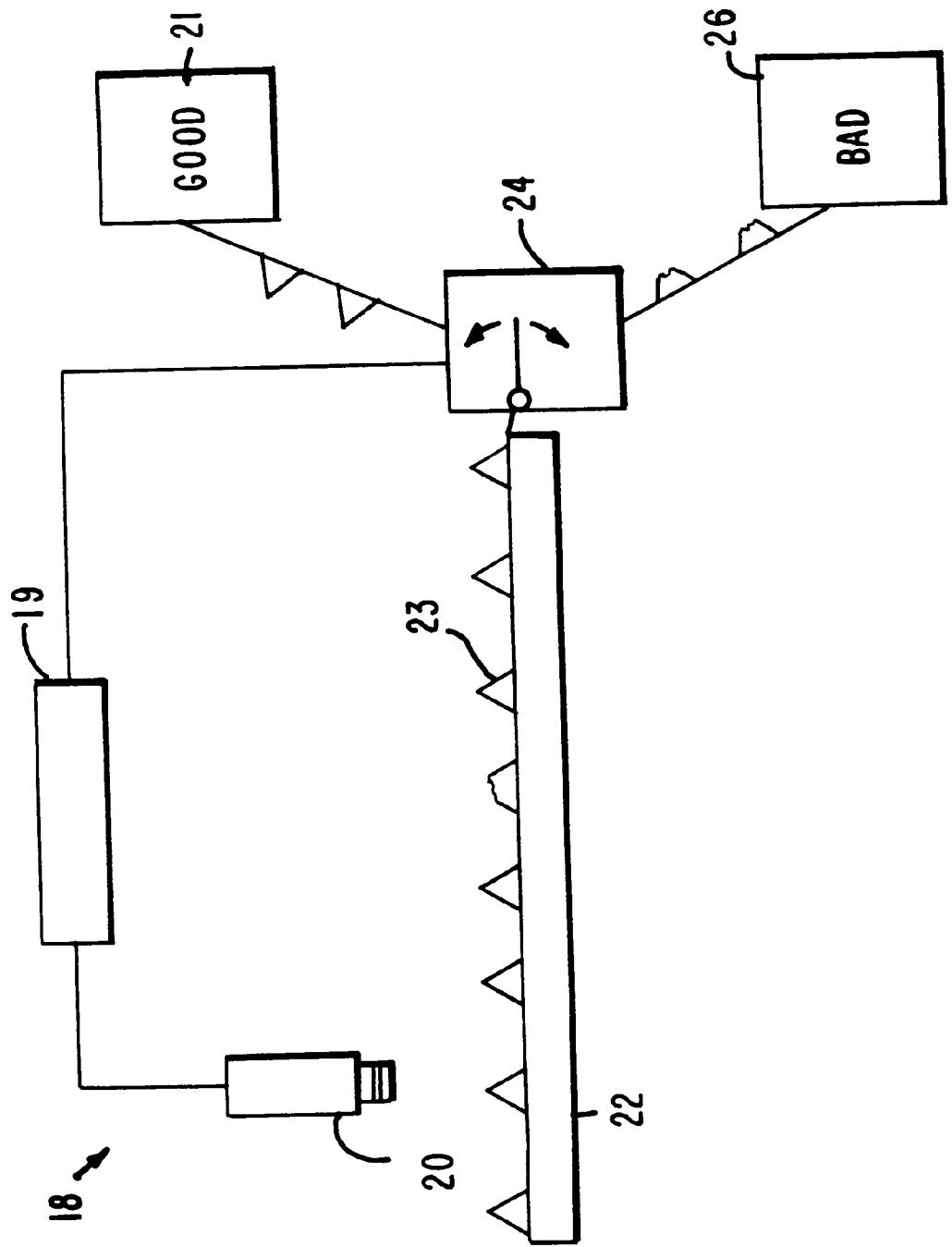

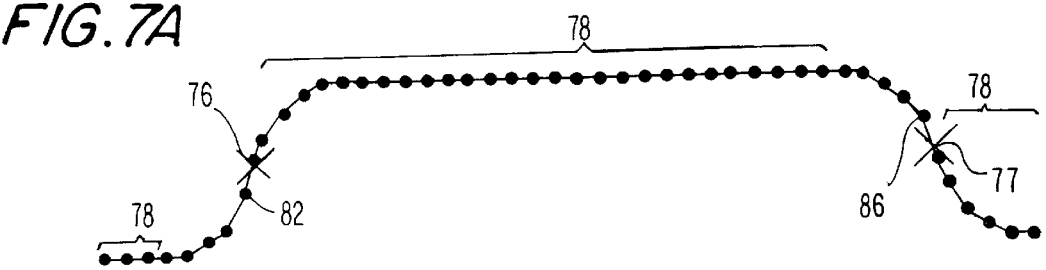
FIG. 7A
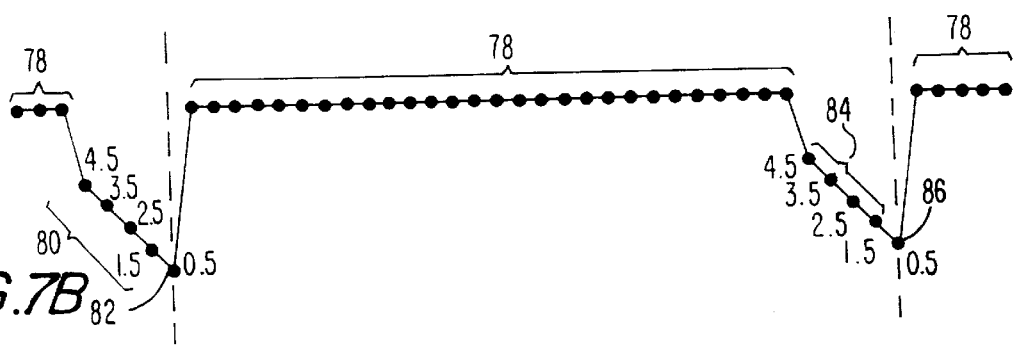
FIG. 7B
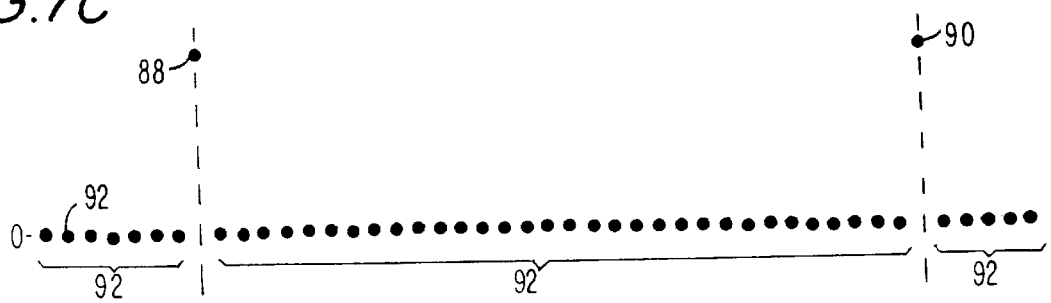
FIG. 7C
FIG. 7D

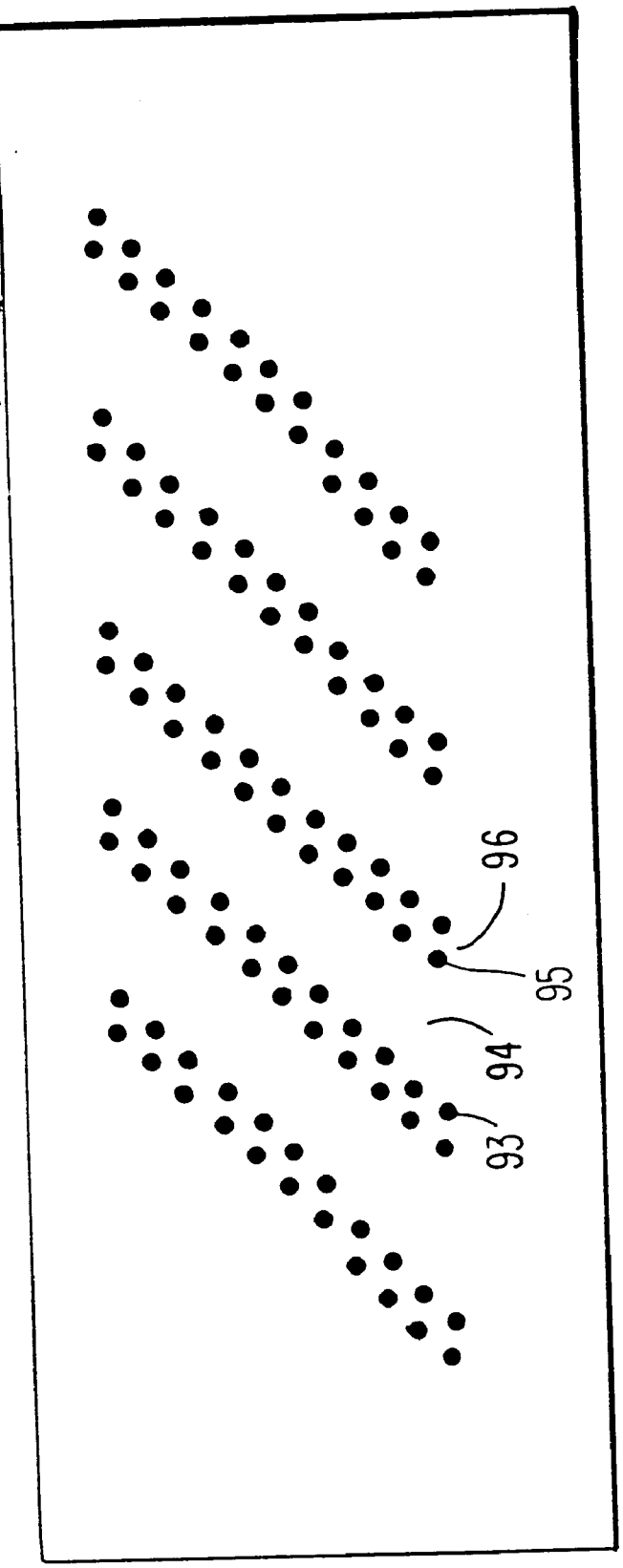

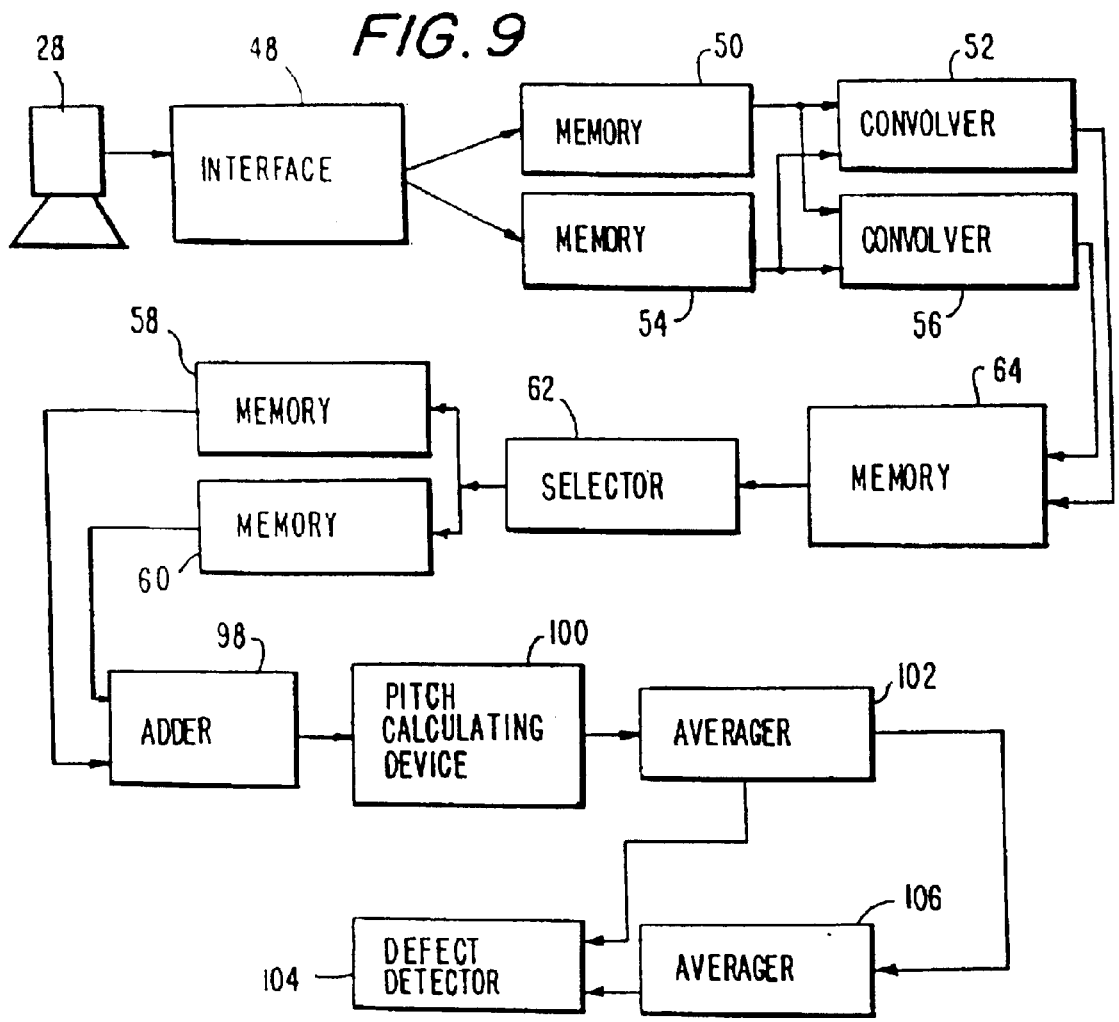

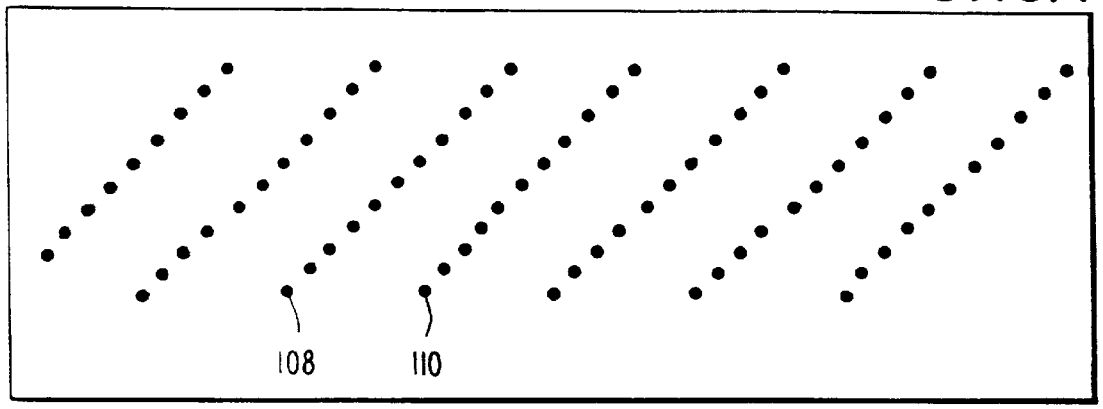
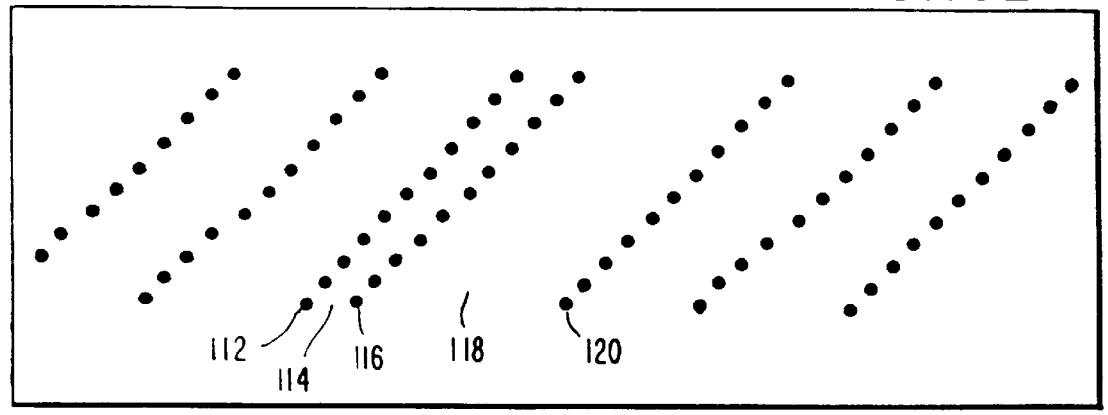

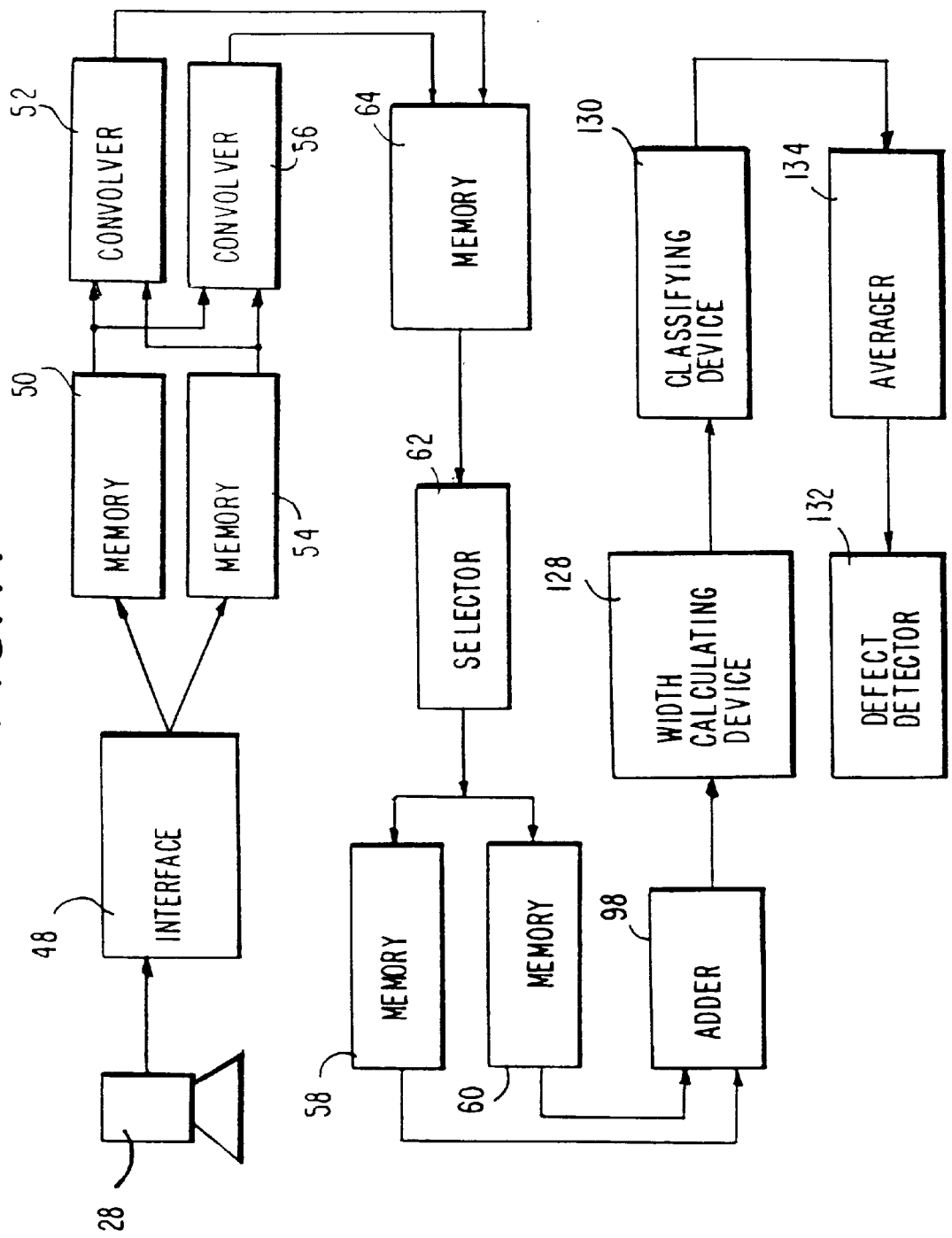

5,031,931

AUTOMATED VISUAL INSPECTION APPARATUS

BACKGROUND OF THE INVENTION

This invention relates to defect detection apparatus for visually inspecting and measuring the features of an object, and, more particularly, to such apparatus for inspecting a perforated object for etch defects and measuring the dimensions of such defects.

Despite efforts to insure uniformity, modern manufacturing processes continue to mass-produce products with varying characteristics. Inspection mechanisms are utilized to sort units of product according to the individual characteristics of each. In some applications, both objective and subjective quality standards are applied to judge a product's characteristics. Extremely fine gradations of quality can pose a difficult inspection challenge.

In some industries, teams of human inspectors are employed to inspect the output of mass-production manufacturing to determine the compliance of each unit of product with the applicable standards. Relative to automated manufacturing, the process of human inspection has proven to be slow, inefficient, and costly, thereby limiting overall manufacturing throughput. In some industrial settings human inspection is entirely infeasible because the demands for speed and accuracy simply exceed human capacity.

At present, human inspectors are still utilized by video display manufacturers to inspect video display components. A particularly time-consuming and exhausting task is the inspection of aperture grills. An example of an aperture grill 201 is illustrated in FIGS. 1A, 1B and 1C. An aperture grill is used during the manufacture of video displays to mask the interior surface of a display screen for the application of phosphorus coatings. Also, aperture grills are physically incorporated into video display screens as a means for focusing an incident beam of electrons from an electron gun.

Typically, an aperture grill 201 is comprised of a thin sheet 202 of material, preferably metal, in which a number of openings 203 and 204 have been formed. As depicted in FIG. 1A, the aperture grill 201 includes a number of openings 203, preferably substantially rectangular. Long, thin and substantially rectangular openings are referred to as "slits". The long, thin portions of the sheet 202 that remain interspersed among the openings 203 are called "ribbons" 206, also referred to as "tapes". In the following discussion, the terms "slits" and "ribbons" should be understood to include "openings" and "tapes", respectively.

In a preferred embodiment, the width of each of slits 203 is between 140 and 260 microns and the width of each of ribbons 206 is between 500 and 1000 microns. These ranges are given merely as examples, as an aperture grill need not be so limited.

At each end of the aperture grill 201, and substantially parallel to the slits 203, is a breakaway tab 204. Each breakaway tab 204 preferably consists of an opening with two long straight sides and two curved ends 205. An aperture grill may be perforated with a number of additional openings; however, description of such has been omitted in the interest of brevity.

FIG. 1B represents a magnified illustration of areas A of FIG. 1A. FIG. 1B illustrates ribbons 206, ribbon widths 204', pairs of edges 207, under-etch defect 208, over-etch defect 209, slits 210–214, pitches 214'–214', and pitches 214"–214". It will be understood that the dotted portions of FIG. 1B represent extensions of each of ribbons 206.

Under-etch defect 208 and over-etch defect 209 result from process variations which occur during the etching of the slits 210–214. As illustrated, under-etch defect 208 results in an excess of material protruding from one of ribbons 206 into a slit 210. Consequently, the under-etch defect 208 interrupts one of the otherwise substantially straight edges 207 of slit 210. Similarly, over-etch defect 209 results in a localized void in one of ribbons 206, increasing the width of a slit 211 at the location. Consequently, the over-etch defect 209 interrupts one of the otherwise substantially straight edges 207 of slit 211.

An etch defect of large enough size will render a particular aperture grill unsuitable for use. Specifically, an aperture grill containing a single etch defect having dimensions greater than 50 microns will cause an undesirable blemish on an operating video display into which it is incorporated. However, the detection of even smaller defects may be necessary and the present invention is not limited to the detection of defects of any particular dimensions.

In FIG. 1B, the slits 210, 211, and 214 have approximately the same width (ignoring localized defects), whereas slits 212 is relatively wider and slits 213 is relatively thinner. Each of ribbons 206 has the same width (ribbon width 206').

A "pitch" may be defined as the distance between two corresponding edges of two adjacent pairs of edges 207 (e.g. the distance between the left-hand edges or the right-hand edges of two adjacent silts). Thus, there are at least two ways to define the pitches of an aperture grill. For example, pitch 212' is the distance between the right-hand edge of slit 211 and the right-hand edge of slits 12, and thus spans slit 212. Pitch 212" is the distance between the left-hand edge of slits 212 and the left-hand edge of slit 213.

As illustrated in FIG. 1B, it is apparent that the pitch (212', 212") spanning slit 212 is greater than the pitch (214', 214") spanning slit 214. In contrast, the pitch spanning slit 213 (213', 214") is less than the pitch spanning slit 214 (214', 214"). A pitch defect is defined as a pitch which varies substantially from the average of the pitches of an aperture grill. For a typical video display, pitch defects in excess of three percent of the average pitch of the aperture grill are noticeable to the human eye, and render the aperture grill unsuitable for use. Pitches 212' (214" and 214' (21") illustrate two types of pitch defects.

Another type of defect that occurs in aperture grills is a width defect. Examples of four width defects are provided in FIG. 1C. FIG. 1C presents a magnified illustration of area B of FIG. 1A. FIG. 1C illustrates ribbons 206, 206a, and 206b; ribbon widths 206', 206a', and 206b'; slits 214–217; and slit widths 214'–217'. As depicted, each of ribbons 206 is of the same width 206', whereas ribbon 206a has a greater width 206a' and ribbon 206b has a lesser width 206b'. Each of slits 215 is of the same width 214', whereas slit 16 has a lesser width 16' and slit 217 has a greater width 217'.

If it is assumed that width 206' is a typical ribbon width and width 214' is a typical slit width, then ribbon 206a demonstrates a first type of width defect as it is wider than ribbon 206, i.e. 206a' is greater than 206'. Ribbon 206b demonstrates a second type of width defect as it is thinner than ribbon 206, i.e. 206b' is less than 206'. Slit 216 demonstrates a third type of width defect as it is thinner than slit 214, i.e. 216' is less than 215'. Slit 217 demonstrates a fourth type of width defect as it is wider than slit 215, i.e. 217' is greater than 215'.

It should be appreciated that the concepts of pitch, pitch defect, and width defect may be defined in numerous ways and that the present invention is not limited to the above-described definitions. For example, pitch might be calculated as the distance between the centers of two adjacent slits or between the centers of two adjacent ribbons. A pitch defect might be defined as a pitch which falls outside a predetermined range of pitches. Further, it should appreciated that any portion of an aperture grill may include one or more under-etch, over-etch, pitch, ad width defects.

Although automatic visual inspection systems have been created to meet the inspection demands of a variety of specific manufacturing applications, the inspection of aperture grills has yet to be automated. A visual inspection system 18 is illustrated in FIG. 2. As shown therein, such a system 18 includes a transport mechanism 22, a scanner 20, a processor 19, a sorter 4, a "good" bin 21, and a "bad" bin 26.

In the system 18 of FIG. 2, the transport mechanism 22 conveys a series of objects 23 through the scanning field of scanner 20 to the sorter 24. Scanner 20 acquires a visual image of each object 23 and sends the image to the processor 19 to be analyzed. The processor 19 analyzes the visual image corresponding to each of the objects 23 and classifies the particular object 23 as either "good" or "bad." Accordingly, the processor 19 controls the operation of sorter 24, causing it to route each object 23 to either the "good" bin 21 or the "bad" bin 26.

To date, aperture grills have been considered unsuitable for automatic visual inspection due to the limited resolution of available imaging technology and the considerable expense of hardware capable of processing vast amounts of image data at assembly-line speeds. Thus, an economically feasible automatic visual inspection system suitable for inspecting aperture grills for etch and pitch defects in a manufacturing environment is needed.

OBJECTS AND SUMMARY OF THE INVENTION

Therefore, an object of the present invention is to provide an automatic visual inspection system suitable for inspecting aperture grills in a manufacturing environment.

It is an additional object of the present invention to provide apparatus for determining at least one edge of an aperture grill having a plurality of slits with respective edges.

Another object of the present invention is to provide apparatus for measuring the pitch of ribbons and slits of an aperture grill.

A further object of the present invention is to provide apparatus for measuring the widths of ribbons and slits of an aperture grill.

A still further object of the present invention is to provide apparatus for classifying measured pitches and ribbon widths as either acceptable of unacceptable defects.

Yet another object of the present invention is to provide a real-time, automatic, visual inspection apparatus, having a pipeline data processing configuration, for inspecting aperture grills for pitch and ribbon width defects and for classifying such defects.

In accordance with an aspect of the present invention, apparatus or determining at least one edge of an object having a plurality of openings with respective edges is provided. The apparatus is comprised of an imaging device for generating an image signal of the object, the image signal representing light intensity values of a plurality of pixels, and a processing device for receiving and processing the image signal to estimate a linear relationship derived from the light intensity values of a predetermined number of the pixels. A device determines whether the linear relationship includes at least one light intensity value corresponding to an edge.

In accordance with another aspect of the present invention, the aforementioned apparatus is used to determine pitch defects in the openings of the object. A plurality of linear relationships are estimated, with each of the linear relationships representing a portion of a respective line defined by at least one line portion parameter. A determining device, responsive to output signals that represent the line portion parameters of respective lines, determines whether each of the linear relationships includes a light intensity value corresponding to a respective edge and estimate a position of the respective edge as a function of the respective light intensity value. The determining device provides a plurality of sets of position signals, each set having at least one position signal representing the position of one respective edge. A calculating device, responsive to the sets of position signals, calculates at least one pitch value between corresponding edges of adjacent openings, and a defect determining device determines whether a pitch value falls outside a predetermined range of values to provide an indication of a pitch defect.

In accordance with yet another aspect of the present invention, the aforementioned apparatus is used to determine width defects in the openings of the object or in the ribbons which separate the openings. A plurality of sets of position signals are estimated, each set having at least one position signal representing the position of a respective edge of a ribbon, and a calculating device, responsive to the sets of position signals, calculates a width of at least one ribbon or opening to obtain at least one calculated width, each calculated width corresponding to the distance between two adjacent edges. A defect determining device determines whether a calculated width falls outside a predetermined range of widths to provide an indication of a width defect.

In each of the aforementioned aspects of the invention it should be noted that the object to be inspected could be an aperture grill having slits, a shadow mask having circular holes or rounded slots, or any other perforated device.

Other objects, features, and advantages according to the present invention will become apparent from the following detailed description of illustrated embodiments when read in conjunction with the accompanying drawings in which the same components are identified by the same reference numerals.

BRIEF DESCRIPTION OF THE DRAWINGS

FIG. 2 is a diagram of a general automatic visual inspection apparatus;

FIGS. 7A–7D are signal diagrams to which reference will be made in explaining the operation of the edge detection apparatus of FIG. 4;

FIG. 8 is a diagram of pixels representing edge of an aperture grill;

FIG. 9 is a block diagram of pitch defect detection apparatus according to another embodiment of the present invention;

FIGS. 10A and 10B are diagrams of pixels representing edges of an aperture grill; and FIG. 11 is a block diagram of width defect detection apparatus according to another embodiment of the present invention.

DETAILED DESCRIPTION OF THE PREFERRED EMBODIMENTS

Figure 1A:
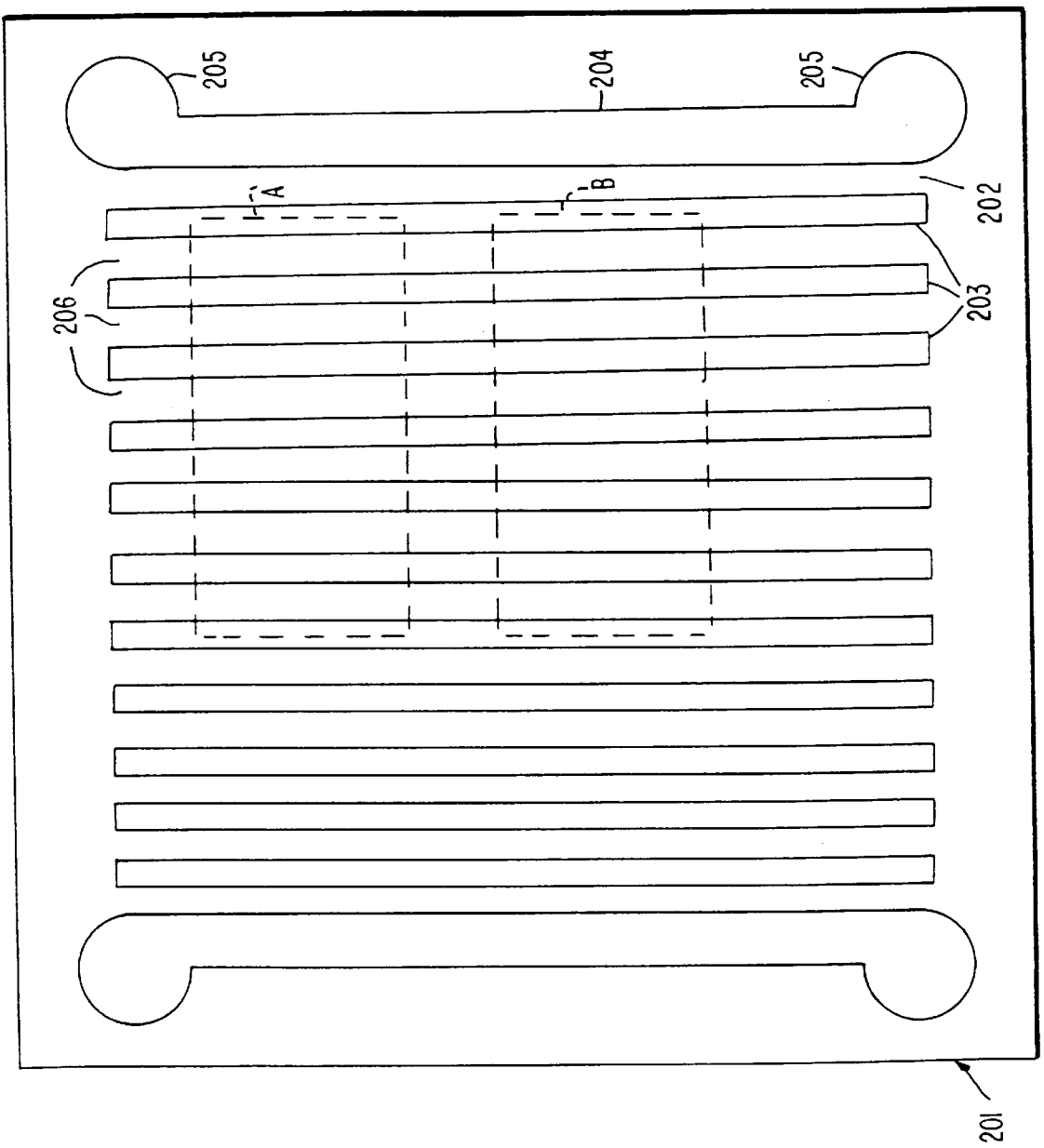
FIG. 1A is a diagram of an aperture grill.
Figure 1B:
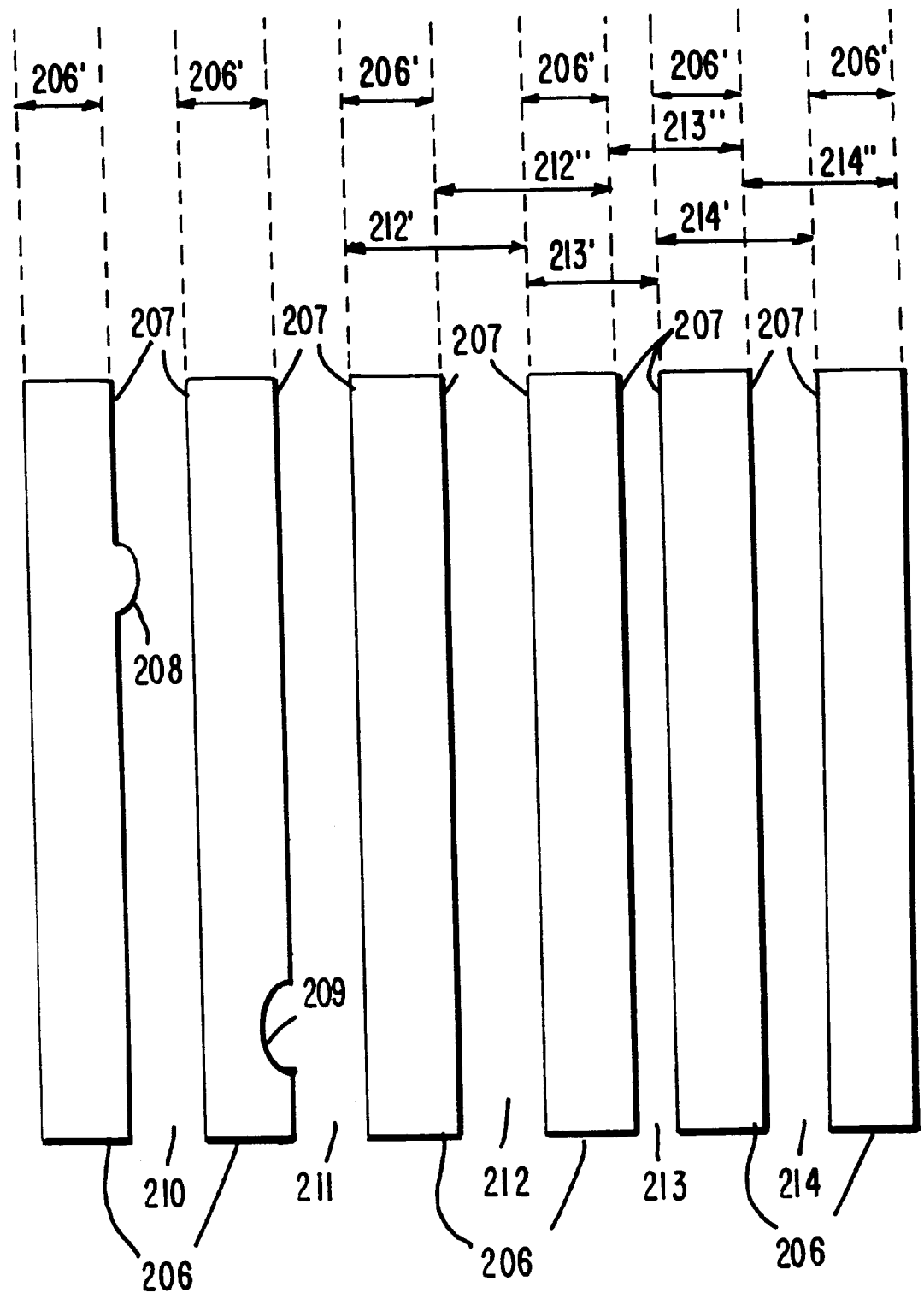
FIGS. 1B and 1C are diagrams of portions of the aperture grill of FIG. 1A.
Figure 1C:
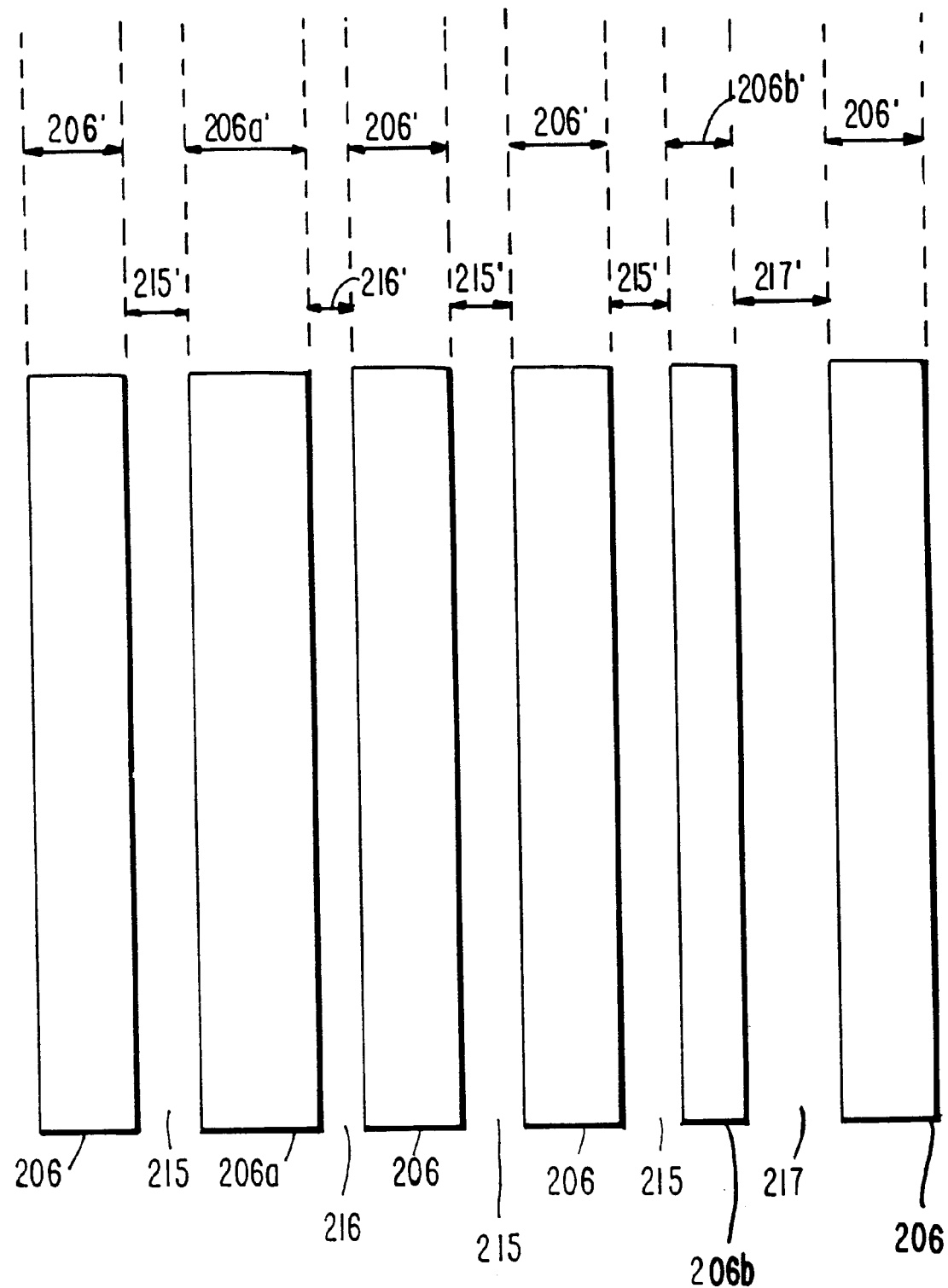
Figure 3:
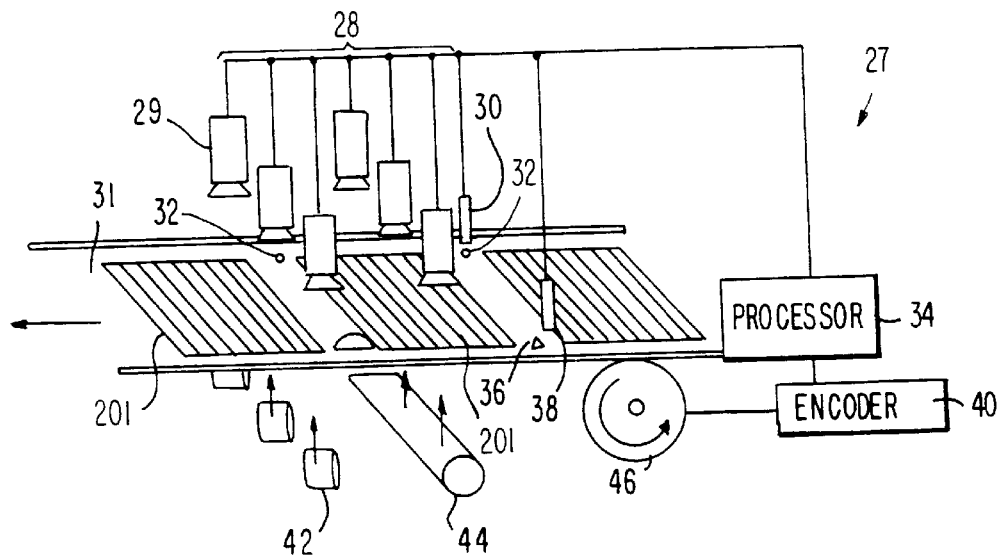
FIG. 3 is a schematic diagram of an automatic visual inspection apparatus according to an embodiment of the present invention.

FIG. 3 illustrates automatic visual inspection apparatus 27 for inspecting an entire aperture grill. The apparatus 27 generally includes a camera array 28, a mask sensor 30, a processor 34, a cycle detector 38, an encoder 40, lighting devices 42 and 44, and a motor 46. Each aperture grill 201, hereinafter "grill", is situated on a web 31 and is separated from the adjacent grills by mask holes 32 in web 31. Further, groups of grills are delineated by cycle hole 36 in web 31. In the preferred embodiment, a single cycle of aperture grills consists of a group of twenty-seven grills.

Camera array 28 is comprised of one or more cameras 29 adapted to acquire images of an object as pixels of image data. Typically, each camera 29 is comprised of a plurality of light-sensitive sensors, each of which produces light intensity values as a function of the amount of incident light. A light intensity value, matched with the relative coordinates of the sensor, forms a pixel. Thus, the acquired image is represented by a plurality of pixels, each pixel having a light intensity value and identifying coordinates. Each camera 29 in the array 28 may be associated with a microprocessor system (such as a Motorola 68040 microprocessor-based system) and/or a dedicated image processor (such as a Datacube MAXTD) for immediate data processing of acquired image data.

Mask sensor 30 and cycle detector 38 are detection devices that sense the presence of markings on web 31. Mask hole 32 and cycle hole 36 are two such markings, preferably arranged at opposite ends of web 31 to avoid erroneous detections.

Processor 34 is connected to each camera 29 in camera array 28, mask sensor 30, cycle detector 38, encoder 40, and lighting devices 42 and 44. Processor 34 is a software-controlled microprocessor-based system which receives input signals from camera array 28, mask sensor 30, cycle detector 38, and encoder 40. Based upon the input signals, processor 34 provides control signals to lighting devices 42 and 44 and to camera array 28. Through control signals, processor 34 coordinates the movement, lighting, and scanning of the aperture grills 201 to assure system-wide synchronization.

Also, processor 34 is coupled to and provides information signals to one or more peripheral devices (not shown). The peripheral devices may include data storage devices, performance monitoring devices, sorting devices, marking devices, etc. The information signals may detail the operating characteristics of the various components of the automatic visual inspection system 27 and may include real-time inspection information regarding the aperture grills 201.

Motor 46 is mechanically engaged with web 31, driving web 31 forward as indicated by the arrow in FIG. 3. As web 31 moves forward, it carries a plurality of aperture grills 201 through the scanning fields of camera array 28, mask sensor 30, and cycle detector 38. Processor 34 collects information relating to the position and speed of the web from mask sensor 30, cycle detector 38, and encoder 40 and determines the position and speed of the web and the beginning of a cycle of grills and/or the beginning of the single grill. Based upon the position and speed of the web, processor 34 calculates the appropriate light intensity level for each of lighting devices 42 and 44 and provides appropriate intensity signals to each.

Encoder 40 is a detection device for monitoring the operation of motor 46. As motor 46 turns, propelling web 31 forward, encoder 40 detects the change in position of the motor and generates a position signal representative thereof. For example, each increment of rotation of the motor may be represented by a single digital pulse.

As will be appreciated by one of ordinary skill, since the linear displacement of web 31 can be expressed as a function of the angular displacement of motor 46, the position and speed of the web, and the like, can be determined from the position signal. In a preferred embodiment, the encoder is configured to generate one digital pulse each time the motor rotates through an angle sufficient to drive the web a certain distance, for example 25, 50, or 100 microns. Encoder 40 supplies the position signal to processor 34 and/or to camera array 28 directly. Processor 34 is adapted to calculate from the position signal and other input data the position and speed of web 31, or the like, and generate appropriate control signals for supply to the camera array and the lighting devices. Alternatively, microprocessor systems (such as a Motorola 68040 microprocessor-based system) associated, respectively, which each of the cameras in array 28 may perform such calculations and the like. Preferably, the position signal from encoder 40 is supplied directly to one or more cameras in camera array 28 to synchronize camera operation with movement of the aperture grills.

Each camera 29 in array 28 acquires image data representing a portion of an aperture grill 201 which has passed through its scanning field. Acquired image data is transmitted to processor 34 for processing and analysis. Optionally, acquired image data is pre-processed locally by individual microprocessor systems associated, respectively, with each camera 29 prior to being transmitted to processor 34. Processor 34 processes the image data and analyzers the processed data for indications of defective aperture grills in the manner to be described below. The location and type of each defect, along with other information regarding each aperture grill, may be stored or provided to peripheral devices.

Figure 4:
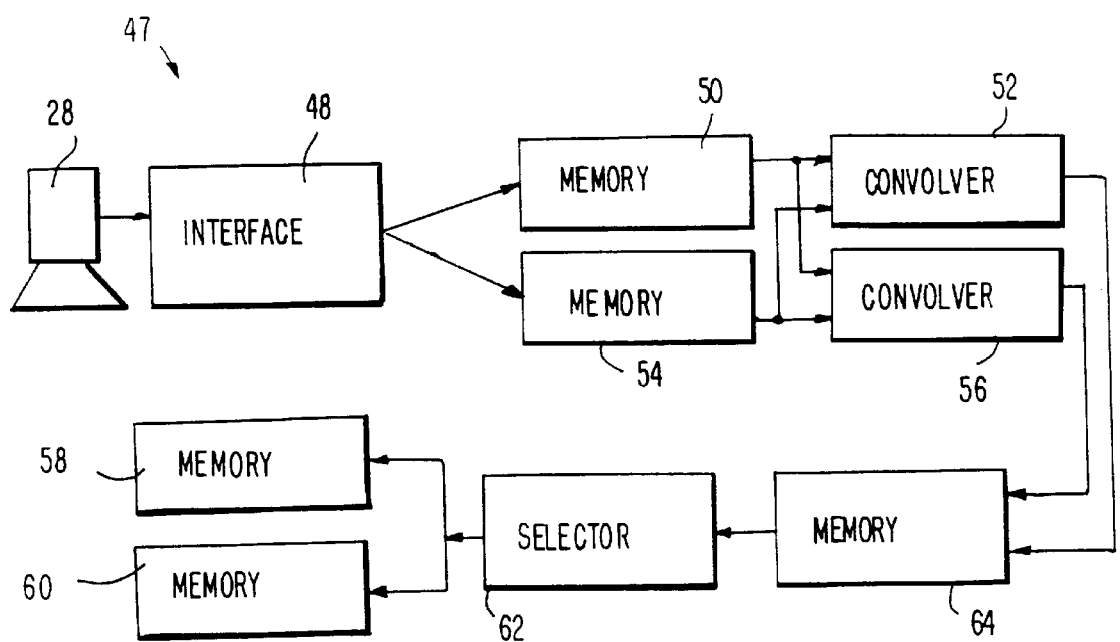
FIG. 4 is a block diagram of edge detection apparatus according to an embodiment of the present invention.

According to one embodiment of the present invention, camera 29 and processor 34 of FIG. 3 form an edge detection apparatus 47, as illustrated in detail in FIG. 4. The edge detection apparatus 47 is comprised of camera 29; interface 48; buffer memories 50 and 54; edge memories 58 and 60; and lock-up table memory 64; convolvers 52 and 56; and selector 62. Edge detection apparatus 47 has a pipelined architecture, facilitating the storage, processing, and compression of large quantities of pixel data at assembly-line speeds. An automated visual inspection system incorporating the edge detection apparatus of the present invention quickly and efficiently identifies the edge of an inspected object and thus alleviates the inspection bottleneck which has substantially limited prior art manufacturing efforts.

Camera 29 is a conventional scanning device, such as a Dalsa linescan camera that generates one line of image data formed of 2048 pixels. Preferably, lines of image data are acquired at approximately 100 micron intervals along each aperture grill. Each sensor of the Dalsa camera has an 8×8 micron resolution resulting in an overall scan width of 16.384 mm. The Dalsa camera acquires 1,650 lines per second to produce 3.379M pixels of information per second. Interface 48 is coupled to and receives lines of pixel data from camera 29 and is also connected to each of buffer memories 50 and 54 to selectively provide each buffer memory with such lines of pixel data. Buffer memories 50 and 54 serve as buffers to store and provide blocks of pixel data to convolvers 52 and 56.

In a preferred embodiment, interface 48 alternatively provides a group of lines of pixel data to each of buffer memories 50 and 54. After receiving each group, the respective memory provides the received group to both of convolvers 52 and 56. Thus, buffer memories 50 and 54 operate to alternately store and read out pixel data and thereby serve as buffering storage for the acquired image. Alternatively, interface 48 and buffer memories 50, 54 could be replaced by a single memory unit capable of simultaneously reading and writing stored information.

Convolvers 52 and 56, also referred to as "neighborhood multiplier accumulators", are coupled to look-up table memory 64, and operate upon groups of pixels to produce a series of look-up table memory addresses. It is preferred that each of convolvers 52 and 56 operates upon 6×1 groups of pixel data to produce a look-up table address coordinate. Taken together, two look-up table address coordinates, one output from each convolver, form a look-up table memory address. Look-up table memory addresses, along with the location coordinates of each corresponding group of pixels, are provided to memory 64. The location coordinates serve to identify the location of the particular group of pixels in an acquired image.

Convolvers 52 and 56 each conductor a convolution operation upon a group of pixels. In a preferred convolution operation, the light intensity values of a group of pixels are multiplied by an array (or kernel) of values having dimensions similar to that of the group. The results of these multiplications are summed to produce a single convolution result. The convolution result may serve as a look-up table memory address directly or first be subjected to further processing.

Each of convolvers 52 and 56 is preferably comprised of a series of multipliers and adders. Alternatively, a convolver is comprised of one or more arithmetic units or processors for achieving the convolution result.

Look-up table memory 64 is pre-stored with values and is coupled to selector 62. Look-up table memory 64 functions as a look-up table, accessing one or more stored values in response to each address provided by convolvers 52 and 56. Accessed values, along with location coordinates for each corresponding group of pixels, are output to selector 62.

Selector 62 selects local minima from among the accessed values received from the look-up table memory 64. Selector 62 is coupled to edge memories 58 and 60 and provides one memory with selected local minima and the other with location coordinates for each corresponding group of pixels. Preferably, selector 62 is arranged as a pipelined series of memories and arithmetic logic units. Edge memories 58 and 60 store the data provided by selector 62.

In operation, camera 29 scans an aperture grill having a series of alternating ribbons and slits in a direction substantially perpendicular to the orientation of the ribbons and slits. Light shining through the button surface of the aperture grill creates an image projected to the camera as alternating bands of light, dark, and shades of grey. Further operation of edge detection apparatus 47 will be explained in conjunction with FIGS. 5, 6, 7A–7D, and 8.

Figure 5:
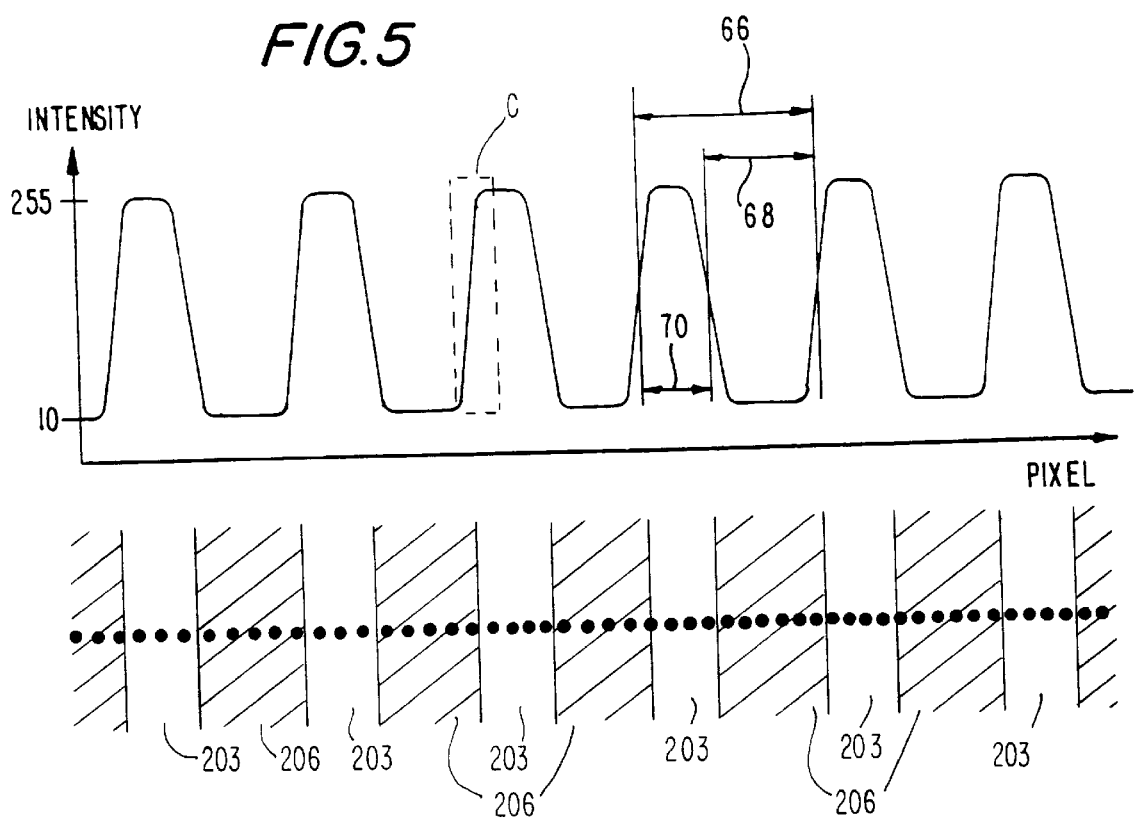
FIG. 5 is a graph of pixel intensities along with a diagram of an aperture grill to which reference will be made in explaining the generation of an image signal.

The graph of FIG. 5 depicts the light intensity values of a line of pixels which represent a portion of an aperture grill. Below the pixel versus intensity graph is the corresponding cross section of the aperture grill upon which the discrete areas image by the pixels have been superimposed. The light intensity value of each pixel can range between 0, corresponding to absolute darkness, and 255, corresponding to bright light, varying smoothly between the two extremes. Slits in the aperture grill are represented by pixels having large intensity values (255) while ribbons are represented by pixels having small intensity values (10). As illustrated, the slits 203 appear to the camera as areas of high light intensity, and thus pixels imaging slit areas have high light intensity values. In contrast, the ribbons 206 appear to the camera as areas of low light intensity, and thus pixels imaging ribbon areas have low light intensity values.

Figure 6:
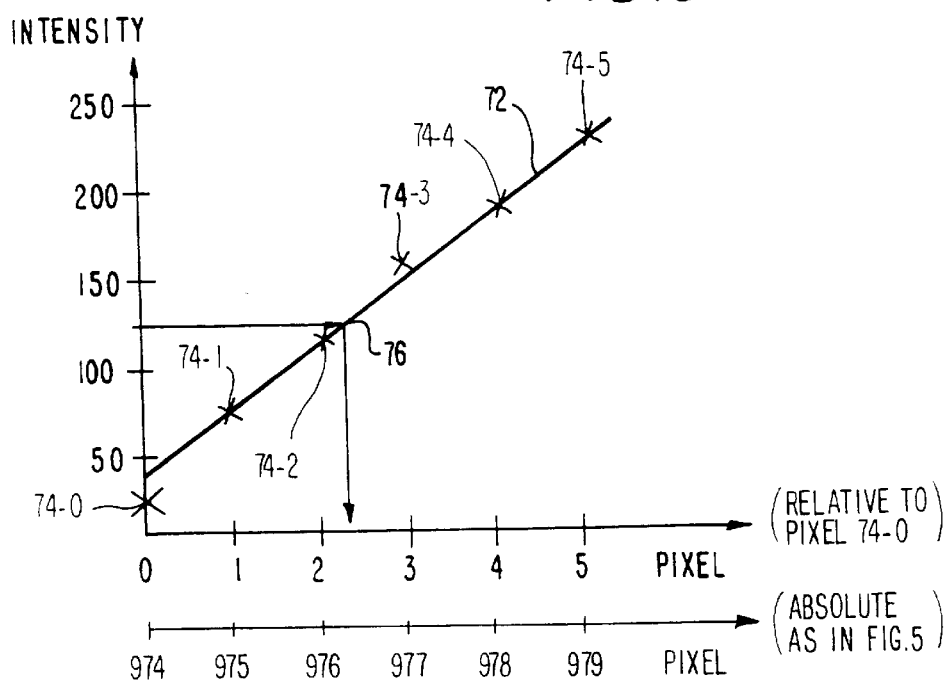
FIG. 6 is a graph of pixel intensities to which reference will be made in explaining the derivation of a linear relationship from a set of light intensity values.

The shared edge of a slit and an adjacent ribbon is estimated as the point on the curve of FIG. 6 which has a light intensity vale approximately halfway between the two extreme intensity values. In this example, the halfway point has an intensity value on the order of 127.5 (=0.5×255). The location of an edge is roughly approximated by the coordinates of the pixel having an intensity value nearest to the halfway point. A more accurate estimate is obtained by calculating the distance between a nearby pixel and the halfway point.

A pitch 66 is calculated as the distance between two halfway points which approximate the locations of two adjacent corresponding edges. A ribbon width 68 is calculated as the distance between two halfway points which approximate the locations of the two edges of a ribbon. Further, a slit width 70 is calculated as the distance between two halfway points which approximate the locations of two edges of a slit.

Camera 29 provides a plurality of lines of pixels to interface 48 which selectively distributes the pixels to each of buffer memories 50 and 54. In turn, buffer memories 50 and 54 provide pixels to each of convolvers 52 and 56. Each convolver 52 and 56 performs a convolution operation on a group of pixels and together provide a look-up table memory address to access a memory location in look-up table memory 64. The convolution operation and its interrelationship with the values stored in look-up table memory 64 will be explained in conjunction with FIG. 6.

FIG. 6 illustrates a portion C of the curve in FIG. 5 comprised of six individual pixels 74-0, 74-1, 74-2, 74-3, 74-4, and 74-5, collectively "pixels 74." The graph of FIG. 6 includes two horizontal axes: an upper axis indicating pixel position relative to pixel 74-0 and a lower axis indicating actual pixels corresponding to those of FIG. 5. Each of pixels 74 is produced by one of a series of adjacent light-sensitive sensors in camera 29 during a single scan by the camera. Pixels 74 have consecutively increasing intensity values which is characteristic of a ribbon-slit edge. Conversely, consecutive pixels having decreasing intensity values is characteristic of a slit-ribbon edge. The group of pixels 74 is approximated by line 72 which is obtained by performing a linear regression operation on the six pixels 74. The line 72, in particular the segment of line 72 extending from pixel 74-0 to pixel 74-5, thus approximately describes the change in light intensity that occurs over the area represented by the six pixels 74.

The six pixels 74 exhibit a range of light intensity values from a low of about 20 to a high of about 225. Since a light intensity value of a halfway point, for example 127.5, must exist between the two extreme intensity values of the six pixels 74, it is surmised that an edge is spanned by the six pixels 74. An approximate location of the halfway point is calculated simply by substituting the value 127.5 into the linear equation which defines line 72 to produce the corresponding pixel coordinate. The point on line 72 having an intensity value of 127.5 is identified by reference numeral 76, and has a pixel coordinate of 2.3, relative to pixel 74-0.

Once the pixel coordinate of point 76 is calculated, the distance (in pixel units) between point 76 and the pixels can be determined. For example, point 76 is a distance of 1.3 pixels from pixel 74-1, 0.3 pixels from pixel 74-2, 0.7 pixels from pixel 74.3, and 1.7 pixels from pixel 74-4.

In a preferred embodiment, line 72 is defined by the equation $I \leq mP+b$, where I is light intensity, m is the slope, P is pixel coordinate relative to pixel 74-0, and b is the offset from zero intensity. The six points 74 are expressed in (pixel coordinate, intensity) form a $(0, I_0), (1, I_1), (2, I_2), (3, I_3), (4, I_4)$, and $(5, I_5)$. By substituting each of points 74 into the general equation for a line, such as line 72, a set of six equations is obtained (not shown here). By simultaneously solving these six equations, six specific coefficients are derived, from which expressions for m and b are obtained in terms of the intensity values of the six pixels 74. Specifically, slope $m=-0.1429I_0-0.0857I_1-0.0286I_2+0.0286I_3+0.0857I_4+0.1429I_5$ and offset $b=0.5238I_0+0.3810I_1+0.2381I_2+0.0952I_3-0.0476I_4-0.1905I_5$. Assuming a left-to-right scan, the slope m will have a positive value if the six pixels 74 span a ribbon-slit edge and a negative value if the six pixels 74 span a slit-ribbon edge.

The convolution operation of convolver 52 is preferably a calculation of the slope m as described above. In a preferred embodiment, convolver 52 is preset with the six coefficients, −0.1429, −0.0857, −0.0286, 0.0286, 0.0857, and 0.1429, which are needed to alculate the value of the slope m of a group of six pixels. Presented with six consecutive pixels 74 by one of buffer memories 50 and 54, convolver 52 calculates the corresponding value of slope m. Following the same procedure, convolver 56 calculates the value of offset b corresponding to the six pixels 74. In this manner, each group of six pixels 74 is approximated by a line defined by a particular combination of slope m and offset b values.

The two values m and b, corresponding to a particular group of six pixels 74, are provided by convolvers 52 and 56, respectively, to look-up table memory 64. Additionally, location coordinates for a reference pixel from the particular group of six pixels 74 are provided. Preferably, the first pixel (e.g. 74-0) of a group of six pixels 74, is utilized as the reference pixel. The location coordinates define the location of the reference pixel, and thus the group of pixels, in an acquired image. By repeating the above-described procedure, convolvers 52 and 56 process lines of pixel data supplied to buffer memories 50 and 54 in groups of six pixels at a time.

In a preferred embodiment, a first group of six pixels is defined from a line of pixels as the first six adjacent pixels starting at one end of the line of pixels. Subsequent groups of six pixels are defined as five adjacent pixels of the preceding group plus the next adjacent pixel. Thus, each group of pixels is offset by one pixel from its two neighboring groups.

As an example, a line defined by eight adjacent pixels (pixels 1-8) would include three consecutive groups of six pixels (pixels 1=6, pixels 2-7, pixels 3-8). As a result, each aperture grill edge is typically spanned by five consecutive groups of six pixels. In the case where a pixel is exactly aligned with a particular edge, six consecutive groups of six pixels span the edge. As an example, by extrapolating the absolute pixel scale of FIG. 6 in both directions, it can be seen that the halfway point 76 is spanned by five consecutive groups of pixels: pixels 972–977, pixels 973–978, pixels 974–979, pixels 975–980, and pixels 976–981. However, if halfway point 76 was exactly aligned with pixel 976, then it would be spanned by six consecutive groups of pixels: pixels 971–976, pixels 972–977, pixels 973–978, pixels 974–979, pixels 975–980, and pixels 976–981.

Given the known resolution of the values output by convolvers 52 and 56, the finite range of intensity values, and the fixed number of pixels approximated by each line, the different possible combinations of slope m and offset b values may be readily anticipated. From each anticipated combination of slope m and offset b values, the pixel distance between a reference pixel and the halfway point, located on the line defined by the particular combination of slope m and offset b values, can be calculated in units of pixels. This pixel distance is referred to as an edge offset value and represents the distance between the reference pixels and an edge.

If the reference pixel is defined as the first pixel from each group of pixels, then the edge offset values for each group spanning an edge range from zero to the total number (N) of pixels in the group minus one. An edge offset value of zero indicates that the first pixel is aligned with the edge while a value of N-1 indicates that the last pixel in the group is aligned with the edge. Edge offset values between zero and N-1 indicate that the edge lies between the first and last pixels at a distance equal to the edge offset value (in pixels units) from the first pixel. Each succeeding consecutive group of pixels spanning the same edge will necessarily have an edge offset value that is one pixel less than its immediately preceding neighboring group.

Look-up table memory 64 is pre-stored with edge offset values corresponding to possible combination of slope m and offset b values. Since the maximum possible edge offset value is equal to the total number of pixels in the group minus one, the size of look-up table memory 64 is minimized. Each pair of slope m and offset b values serve as a look-up table memory address for look-up table memory 64. Upon receiving a look-up table memory address, look-up table memory 64 provides the corresponding pre-stored edge offset value to selector 62.

Alternatively, look-up table memory 64 may be pre-stored with edge offset values corresponding to a subset of the possible combinations of slope m and offset b values. When look-up table memory 64 receives addresses derived from combinations of slope m and offset b values outside this subset, it provides an out-of-range value to selector 62. In the preferred embodiment, this out-of-range value equals 255.

For each group of six pixels processed by convolvers 52 and 56, look-up table memory 64 supplies to selector 62 the location coordinates of the reference pixel in the group and either an edge offset value or an out-of-range value. If an out-of-range value is received, that value and its corresponding coordinates are discarded. From the set of five or six consecutive groups of pixels which span a particular edge, selector 62 selects the group having the minimum edge offset value. The edge offset value of the selected group is provided to edge memory 58 and its location coordinates are provided to edge memory 60.

FIGS. 7A–D are waveform diagrams which are helpful in explaining the preferred operation of selector 62. In FIG. 7A, as in FIG. 5, the vertical axis represents intensity and the horizontal axis represents pixels. FIG. 7A presents a graphical representation of a single slit in an aperture grill. The left and right edges of the slit are indicated by "X" marks 76 and 77, respectively. As the slit is scanned from left to right, pixels 82 and 86 are the pixels closest to marks 76 and 77 respectively. It should also be noted that groupings of six adjacent pixels, taken from left to right, that begin with any of points 78 fail to span either of edges 76 and 77.

In FIGS. 7B and 7C, the vertical axis represents edge offset values and the horizontal axis represents pixels; however, the figures are not to scale. FIG. 7B presents a graphical representation of the edge offset values read from look-up table memory 64 corresponding to the pixels of FIG. 7A in which the left-most (first) pixel of each group is the reference pixel for that group. Points 78 all have the same intensity, an out-of-range value equal to 255. Groupings of six adjacent pixels, taken from left to right, that begin with any of points 80, 82, 84, or 86 span one of edges 76 and 77. Each of points 80, 82, 84, and 86 is labelled with its respective edge offset value. As illustrated, points 82 and 86 are 0.5 pixel units away from edges 76, and 77, respectively.

FIGS. 7C and 7D illustrate a preferred method of selecting pixels having minimum edge offset values. FIG. 7C is a copy of FIG. 7B shifted to the left by one pixel. By appropriately buffering the stream of edge offset values supplied thereto, selector 62 shifts the input stream to the left by one pixel and subtracts the shifted input stream from the unshifted input stream. In effect, the values of FIG. 7C are subtracted from the values of FIG. 7B. The negative results of this subtraction correspond to pixels having a minimum edge offset value.

The result of this subtraction operation is illustrated in FIG. 7D, wherein negative results are mapped to binary 1 and all others to binary 0. Accordingly, points 92, having a value of binary 0, correspond to the aggregate of points 78, 80, and 84. Points 88 and 90, having values of binary 1, correspond to points 82 and 86, respectively. Thus, the point closed to each edge (e.g., points 82 and 86), when approaching from the left, is identified and selected (as indicated by points 88 and 90).

Selector 62 repeats the above-described selection process for each set of five or six groups of pixels scanning each edge of the aperture grill. Edge memories 58 and 60 store the offset value and location coordinates, respectively, of each of the selected pixel groups. In the preferred embodiment, as mentioned above, the location coordinates identify the first pixel of a group. The selected and stored location coordinates and offset values thus describe the location of each edge of the aperture grill with sub-pixel accuracy. The location defined by a particular set of location coordinate and offset values will be referred to hereinafter as an edge point.

FIG. 8 provides a graphical representation of edge location information stored in edge memories 58 and 60. Each edge of the aperture grill appears as a substantially straight line of edge points. Ribbon 94 and adjacent slits 96 are defined, respectively, by pairs of edge points which appear as two substantially straight lines of edge points. For example, ribbon 94 is defined by edge points 93 and 95. The lines of edge points appear slanted because the aperture grill moves between consecutive scans by the camera.

The above description of edge detection apparatus 47 is intended to illustrate and not limit the present invention.

Each element of apparatus 47 is readily adaptable to process pixel groups and pixel data organized in a form other than 6×1 blocks. The interpolation of a more precise estimate of the location of an edge can be achieved by a number of straightforward variations on the linear regression operation described. For example, polynomial, sinusoidal, and other well-known techniques of curve-fitting may also be implemented with a pipelined arrangement of convolvers and memories to estimate the location of an edge. Variations on these techniques are contemplated to process lines of pixel scanned oblique to the edge of an aperture grill. More precise interpolations are expected to be obtained through two-dimensional convolution operations which utilize a series of convolver and memory elements. Further, even greater precision may be obtained by repeating the scanning and interpolating processes for each edge and averaging together the interpolated results. This last method has the added benefit of removing errors introduced by irregular movements of the scanned aperture grill on an assembly line.

A pitch defect detection apparatus according to another embodiment of the present invention is illustrated in FIG. 9. The pitch defect detection apparatus substantially includes the elements of the edge detection apparatus of FIG. 4 as previously described, and further includes an adder 98, a pitch calculating device 100, averagers 102 and 106, and a defect detector 104.

Adder 98 is coupled to each of edge memories 58 and 60 to receive from the memories an edge offset value and corresponding location coordinates for a particular edge, respectively. Adder 98 sums the edge offset value and location coordinates to produce edge point coordinates of an edge point, identifying the location of an edge.

Adder 98 is coupled to pitch calculating device 100 and supplies the pitch calculating device with sets of edge point coordinates. Pitch calculating device 100 stores at least one set of edge point coordinates and calculates the distance between stored coordinates, which identify the location of one edge, and a subsequent set of edge point coordinates, which identify the location of an adjacent corresponding edge. The calculated distance represents a pitch value, and thus corresponds to the pitch between two adjacent corresponding edges.

Averager 102 is coupled to and receives pitch values from pitch calculating device 100 and is adapted to average together multiple pitch values, corresponding to single pitch, to obtain a local average pitch value. By averaging a number of pitch values for the same pitch, pitch measurement errors resulting from assembly-line vibrations are minimized. Averager 102 is further coupled to defect detector 104 and averager 106.

Averager 106 receives local average pitch values from averager 102 and operates to average together multiple local average pitch values, corresponding of a number of pitches, to obtain a global average pitch value. Preferably, the global average pitch value is calculated from the set of local average pitch values which, in turn, are derived from the set of all pitches of an aperture grill. Averager 106 is coupled to defect detector 104 and provides global average pitch values thereto.

Defect detector 104 receives local average pitch values from averager 102 and determines whether a particular local average pitch value indicates a pitch defect. Local average pitch values are compared to a predetermined range of pitch values, and if a particular value falls outside that range, the presence of a defect is noted. The exact ranges of acceptable local average pitch values will vary according to the specific inspection requirements of the particular application. In aperture grill manufacturing, it is preferred that local average pitch values vary less than three percent from a target local pitch value.

Similarly, defect detector 104 receives global average pitch values from averager 106 and determines whether a particular global average pitch value indicates a pitch defect. The global average pitch value is compared to each of the local average pitch values. If the difference between the compared pitch values exceeds a predetermined thresholds, then it is determined that a defect exists.

The operation of the pitch defect detection apparatus will further be described with reference to FIGS. 10A–10B. FIG. 10A illustrates a series of parallel, regularly-spaced lines comprised of edge points. These lines represent adjacent corresponding edges of an aperture grill. For example, edge points 108 and 110 represent the right (or left) edges of two adjacent slits (or ribbons). As illustrated, the pitches of the pairs of adjacent lines are substantially equal.

In operation, adder 98 receives from edge memories 58 and 60 the edge offset value and location coordinates for edge point 108 and produces edge point coordinates for edge point 108. The edge point coordinates of edge point 108 are supplied to pitch calculating device 100. In a similar manner, adder 98 produces edge point coordinates for edge point 110 and supplies those coordinates to the pitch calculating device.

Pitch calculating device 100 stores edge point coordinates of edge points 108 and 110 and calculates the distance between them. This distance, which is the pitch between edge points 108 and 110, is supplied to averager 102 which averages the calculated pitch between edge points 108 and 110 with other pitches calculated for the same two edges to produce an average width value. For example, the pitch of points 109 and the pitch of points 111 are averaged with the pitch between points 108 and 109 to a produce a local average pitch value.

Defect detector 104 compares the local average pitch value produced by averager 102 to a predetermined range of values to determine the presence of a local pitch defect. If the local average pitch value is within the predetermined range of values, then no local pitch defect is indicated. Otherwise, defect detector 104 may store the defective pitch value, the edge point coordinates of the corresponding edges, or other information regarding the defective pitch. Additionally, the defect detector may increment a defect counter; or otherwise note the presence of a pitch defect.

FIG. 10B illustrates a second section of the same aperture grill illustrated in FIG. 10A. In particular, a series of parallel, irregularly-spaced lines comprised of edge points are shown. As depicted, pitch 114, between edge points 113 and 116, is less than pitch 112, while pitch 118, between edge points 116 and 120, is greater than pitch 112. If defect detector 104 is provided with as appropriately small range of local average pitch values, for example pitch 112 +/– 3%, the defect detector will identify the local average pitch values of pitches 114 and 115 as being outside that range and therefore indicative of a defect.

Each of the local average pitch values for pitches 112, 114, and 118 is also supplied by averager 102 to averager 106. Averager 106 averages these local averager pitch values with the local average pitch values for the pitches of the remainder of the aperture grill to produce a global average pitch value. As an example, the global average pitch value may equal pitch 112 +/– 10%. This global average pitch value is provided to defect detector 104. Assuming a defect threshold of only 5%, defect detector 104 determines that a defect exists when it compares this global average pitch value with pitch 112.

According to another embodiment of the present invention, a width defect detection apparatus is illustrated in FIG. 11 and substantially includes the elements of the edge detection apparatus of FIG. 4 as previously described. The width defect detection apparatus further includes an adder 98, a width calculating device 128, a classifying device 130, an averager 130, and a defect detector 132.

Adder 98 has the same structure and function as adder 98 which is included in the pitch defect detection apparatus described above. Adder 98 supplies width calculating device 128 with sets of edge point coordinates. The width calculating device stores at least one set of edge point coordinates and calculates the distance between the stored coordinates, identifying the location of one edge, and a subsequent set of edge point coordinates which identify the location of an adjacent edge. The calculated distance, a width value, thus corresponds to the width between two edges.

Classifying device 130 is coupled to width calculating device 128 to receive width values therefrom and to classify each width value as corresponding either to a ribbon or to a slit. Classifying device 130 stores predetermined ranges of width values for ribbons and slits, respectively. Individual width values are compared to the stored ranges to determine whether a particular width value is characteristic of a ribbon or a slit so as to be classified as either a calculated ribbon width or a calculated slits width. The classifying device 130 selectively provides calculated ribbon widths, calculated slits widths or both to averager 134.

Averager 134 receives width values from classifying device 130 and averages together multiple width values, corresponding to a single ribbon or slit, to obtain an average with value. By averaging a number of width values for the same ribbon or slit, width measurement errors resulting from assembly-line vibrations are minimized.

Defect detector 132 is coupled to and receive average width values from averager 134 to determine therefrom whether a particular average width value indicates a width defect. Average width values for slits or ribbons are compared to a corresponding predetermined range of average width values, and if a particular value falls outside that corresponding range, the presence of a width defect is noted.

The operation of the width defect detection apparatus will further be described with reference to FIG. 8. Adder 98 receives from edge memories 58 and 60 the location coordinates and edge offset value for edge point 93, calculates its edge point coordinates, and supplies these coordinates to width calculating device 128. In a similar manner, adder 98 calculates and supplies the edge point coordinates of edge point 95 to width calculating device 128.

Width calculating device 128 stores the edge point coordinates of edge points 93 and 95 and calculates the distance between then. This distance, the width between edge points 93 and 95, is supplied to classifying device 130 which classifies this width as characteristic of a ribbon and supplies data representing this calculated ribbon width to averager 134. In a similar fashion, additional calculated ribbon widths are classified, selected, and then supplied to averager 134. Averager 134 averages the width between the edge points 93 and 95 with other widths calculated for the same two edges to produce on average width value.

Defect detector 13 compares the average width value to a predetermined range of average width values to determine the presence of a width defect. If the average width value is within the predetermined range, then no width defect is found. Otherwise, defect detector 132 may store the defective width value, the edge point coordinates of the corresponding edges, or other information regarding the defective width; increment a defect counter; or otherwise note the presence of a width defect.

As will be appreciated by one of ordinary skill in the art, the present invention is operable to inspect any type of perforated object both in whole and in part. Light passing through or reflecting off of the object to be inspected results in an image that is detected by the imaging device. In accordance with the techniques described herein or obvious modifications thereof or with known techniques, the detected image is processed to detect and classify defects in the object. Adaptation of the described embodiments to accommodate specific object configurations, specific processing criteria, or specific defect criteria clearly fall within the scope of the appended claims as such adaptation is obvious, in view of the present disclosure, to one of ordinary skill. Thus, it must be understood that the configuration of the object to be inspected by the apparatus of the present invention is not limited to the illustrative examples described herein.

Although illustrative embodiments of the present invention and modifications thereof have been described in detail herein, it is to be understood that this invention is not limited to these precise embodiments and modifications, and that other modifications and variations may be affected therein by one skilled in the art without departing from the scope and spirit of the invention as defined by the appended claims.

What is claimed is:

1. Apparatus for determining at least one edge of a device having a plurality of openings with respective edges, said apparatus, comprising:

imaging means for generating an image signal of said device, said image signal representing maximum and minimum light intensity values of a plurality of pixels;

processing means for receiving and processing said image signal to estimate a linear relationship derived from the light intensity values of a predetermined number of said pixels, said linear relationship representing a portion of a line defined by the portion parameters; and determining means for determining whether said linear relationship includes at least one light intensity value corresponding to an edge, said determining means including a memory for storing a plurality of preset edge offset values each corresponding to a distance between a respective pixel and a respective edge and for storing at least one set of predetermined line portion parameters, said memory receiving said line portion parameters as an address and outputting one edge of offset value corresponding to an estimated distance between one pixel and the respective edge in response to said address, said determining means being operable to estimate a location on said portion of said line having an intensity level approximately equal to a value halfway between the maximum and minimum light intensity levels, said location corresponding to a respective edge, said determining means further including means for comparing said line portion parameters to said at least one set of stored predetermined line portion parameters, and, wherein said determining means is operable to provide the edge offset value corresponding to an estimated distance between one pixel and the respective edge corresponding to said location as an output signal if said line portion parameters are equal to a set of said stored predetermined line portion parameters.

2. Apparatus according to claim 1, wherein said imaging means generates a plurality of image signals, said processing means receives and processes said plurality of image signals, and said determining means provides a plurality of output signals representing edge offset values respectively corresponding to the estimated distances between the respective pixels and edges.

3. Apparatus according to claim 2, further including selecting means for receiving said plurality of output signals from said determining means and for selecting a minimum edge offset value therefrom.

4. Apparatus for inspecting a device having a plurality of openings with respective edges so as to determine pitch defects contained therein, said apparatus comprising:

imaging means for generating a plurality of image signals of said device, each of said plurality of image signals representing maximum and minimum light intensity values of a plurality of pixels;

processing means for receiving and processing said plurality of image signals in estimate a plurality of linear relationships derived from the light intensity values of a predetermined number of said pixels, each of said linear relationships representing a portion of a respective line defined by at least one line portion parameter, said processing means providing a plurality of output signals each representing the line portion parameter of a respective line;

determining means, responsive to said output signals, for determining whether each of said linear relationships includes a light intensity value corresponding to a respective edge and for estimating a position of the respective edge as a function of the respective light intensity value, said determining means including a memory for storing a plurality of preset edge offset values each corresponding to a distance between a respective pixel and the respective edge and for storing at least one set of predetermined line portion parameters, said memory receiving said line portion parameters as an address and outputting one edge offset value corresponding to an estimated distance between one pixel and the respective edge in response to said address, said determining means providing a plurality of sets of position signals each set having at least one position signal representing that the position of one respective edge, said determining means being operable to estimate of the position of the respective edge by estimating a location on said portion of said respective line having a light intensity value approximately equal to a value halfway between said respective maximum and minimum light intensity levels, said location corresponding to the position of the respective edge, said determining means further including means for comparing said line portion parameters to said at least one set of stored predetermined line portion parameters, and wherein said memory means is operable to provide the preset edge offset value corresponding to an estimated distance between one pixel and the respective edge corresponding to said location as a position signal if said line portion parameters are equal to a set of said stored predetermined line portion parameters.

calculating means, responsive to said plurality of sets of position signals, for calculating at least one pitch value between corresponding edges of adjacent openings; and defect determining means for determining whether said at least one pitch value falls outside a predetermined range of values so as to provide an indication of a pitch defect.

5. Apparatus according to claim 4, wherein said calculating means includes selecting means for receiving said plurality of sets of said position signals from said determining means and for selecting the position signal from each of said sets corresponding to a respective minimum edge offset value.

6. Apparatus according to claim 5, wherein said calculating means is operable to calculate a difference between a plurality of pairs of selected position signals to form a plurality of pitch values for each of a plurality of pitches, each pitch corresponding to the distance between two adjacent corresponding edges.

7. Apparatus according to claim 6, wherein said calculating means further includes pitch averaging means for respectively averaging the plurality of pitch values corresponding to each pitch so as to obtain an average pitch values.

8. Apparatus according to claim 7, wherein said defect determining means is operable to determine whether said average pitch value falls outside a predetermined range of values so as to indicate a defect.

9. Apparatus according to claim 6, wherein said calculating means includes pitch averaging means for averaging the respective plurality of pitch values for each of said pitches to obtain a plurality of average pitch values.

10. Apparatus according to claim 9, wherein said calculating means further includes global pitch averaging means for averaging said plurality of average pitch values so as to obtain a global average pitch value.

11. Apparatus according to claim 10, wherein said defect determining means is operable to determine whether a difference between said global average pitch value and one of said average pitch values exceeds a predetermined threshold so as to indicate a defect.

12. Apparatus for inspecting an aperture grill having a plurality of slits, each having two respective longitudinal edges, so as to determine pitch defects contained in said aperture grill, said apparatus comprising:

imaging means for generating a plurality of image signals of said aperture grill, each of said plurality of image signals representing maximum and minimum light intensity values of a plurality of pixels;

processing means for receiving and processing said plurality of image signals to estimate a plurality of linear relationships derived from the light intensity values of a predetermined number of said pixels, each of said linear relationships representing a portion of a respective line defined by at least one line portion parameter, said processing means providing a plurality of output signals each representing the line portion parameter of a respective line;

determining means, responsive to said output signals, for determining whether each of said linear relationships includes a light intensity value corresponding to a respective edge and for estimating a position of the respective edge as a function of the respective light intensity value, said determining means including a memory for storing a plurality of preset edge offset values each corresponding to a distance between a respective pixel and the respective edge and for storing at least one set of predetermined line portion parameters, said memory receiving said line portion parameters as an address and outputting one edge offset value corresponding to an estimated distance between one pixel and the respective edge in response to said address, said determining means providing a plurality of sets of position signals each set having at least one position signal representing the position of one respective edge, said determining means being operable to estimate the position of the respective edge by estimating a location on said portion of said respective line having a light intensity value approximately equal to a value halfway between said respective maximum and minimum light intensity levels, said location corresponding to the position of the respective edge, said determining means further including means for comparing said line portion parameters to said at least one set of stored predetermined line portion parameters, and wherein said memory means is operable to provide the preset edge offset value corresponding to an estimated distance between one pixel and the respective edge corresponding to said location as a position signal if said line portion parameters are equal to a set of said stored predetermined line portion parameters;

calculating means, responsive to said plurality of sets of position signals, for calculating at least one pitch value between the corresponding edges of adjacent openings; and defect determining means for determining whether said at least one pitch value falls outside a predetermined range of values so as to provide an indication of a pitch defect.

13. Apparatus according to claim 12, wherein said calculating means includes selecting means for receiving said plurality of sets of said position signals from said determining means and for selecting the position signal from each of said sets corresponding to a respective minimum edge offset value.

14. Apparatus according to claim 13, wherein said calculating means is operable to calculate a difference between a plurality of pairs of selected position signals to form a plurality of pitch values for each of a plurality of pitches, each pitch corresponding to the distance between two adjacent corresponding edges.

15. Apparatus according to claim 14, wherein said calculating means further includes pitch averaging means for respectively averaging the plurality of pitch values corresponding to each pitch so as to obtain an average pitch value.

16. Apparatus according to claim 15, wherein said defect determining means is operable to determine whether said average pitch value falls outside a predetermined range of values so as to indicate a defect.

17. Apparatus according to claim 14, wherein said calculating means includes pitch averaging means for averaging the respective pluralities of pitch values for each of said pitches to obtain a plurality of average pitch values.

18. Apparatus according to claim 17, wherein said calculating means further includes global pitch averaging means for averaging said plurality of local average pitch values so as to obtain a global average pitch value.

19. Apparatus according to claim 18, wherein said defect determining means is operable to determined whether a difference between said global average pitch value and one of said average pitch values exceeds a predetermined threshold so as to indicate a defect.

20. Apparatus for inspecting a device having a plurality of openings separated by a plurality of ribbons, said openings and ribbons having respective edges and exhibiting respective widths, said apparatus being operable to determine width defects and comprising:

imaging means for generating a plurality of image signals of said device, each of said plurality of image signals representing maximum and minimum light intensity values of a plurality of pixels;

processing means for receiving and processing said plurality of image signals to estimate a plurality of linear relationships derived from the light intensity values of a predetermined number of said pixels, each of said linear relationships representing a portion of a respective line defined by at least one line portion parameter, said processing means providing a plurality of output signals each representing the line portion parameter of a respective line;

determining means, responsive to said outputs signals, for determining whether each of said linear relationships includes a light intensity value corresponding to a respective edge and for estimating a position of the respective edge as a function of the respective light intensity value, said determining means including a memory for storing a plurality of preset edges offset values each corresponding to a distance between a respective pixel and the respective edge and for storing at least one set of predetermined line portion parameters, said memory receiving said line portion parameters as an address and outputting one edge offset value corresponding to an estimated distance between one pixel and the respective edge to response to said address, said determining means providing a plurality of sets of positions signals each set having at least one position signal representing the position of one respective edge, said determining means being operable to estimate the position of the respective edge by estimating a location on said portion of said respective line having a light intensity value approximately equal to a value halfway between said respective maximum and minimum light intensity levels, said location corresponding to the position of the respective edge, said determining means further including means for comparing said line portion parameters to said at least one set of stored predetermined line portion parameters, and wherein said memory means is operable to provide the preset edge offset value corresponding to an estimated distance between one pixel and the respective edge corresponding to said location as a position signal if said line portion parameters are equal to a set of said stored predetermined line portion parameters;

calculating means, responsive to said plurality of sets of position signals, for calculating a width of at least one ribbon or opening to obtain at least one calculated width, each calculated width corresponding to the distance between two adjacent edges; and defect determining means for determining whether said at least one calculated width falls outside a predetermined range of widths so as to provide an indication of a width defect.

21. Apparatus according to claim 20, wherein said calculating means includes selecting means for receiving said plurality of sets of said position signals from said determining means and for selecting the position signal from each of said sets corresponding to a respective minimum edge offset value.

22. Apparatus according to claim 21, wherein said calculating means is operable to calculate a difference between a plurality of pairs of selected position signals to form a plurality of calculated widths for each of the openings and ribbons.

23. Apparatus according to claim 22, wherein said calculating means further includes means for determining if each of said calculated widths falls outside a first predetermined range of widths and means for classifying each of said calculated widths as one of a calculated opening width and a calculated ribbon width and for selecting the calculated ribbon widths.

24. Apparatus according to claim 23, wherein said calculating means further includes averaging means for averaging the selected calculated ribbon widths to obtain an average ribbon width.

25. Apparatus according to claim 24, wherein said defect determining means is operable to determine whether said average ribbon width falls outside a second predetermined range of widths so as to indicate a defect.

26. Apparatus for inspecting an aperture grill having a plurality of openings separated by a plurality of ribbons, said openings and ribbons having respective edges and exhibiting respective widths, said apparatus being operable to determine width defects and comprising:

imaging means for generating a plurality of image signals of said aperture grill, each of said plurality of image signals representing maximum and minimum light intensity values of a plurality of pixels;

processing means for receiving and processing said plurality of image signals to estimate a plurality of linear relationships derived from the light intensity values of a predetermined number of said pixels, each of said linear relationships representing a portion of a respective line defined by at least one line portion parameter, said processing means providing a plurality of output signals each representing the line portion parameter of a respective line;

determining means, responsive to said output signals, for determining whether each of said linear relationships includes a light intensity value corresponding to a respective edge and for estimating a position of the respective edge as a function of the respective light intensity value, said determining means including a memory for storing a plurality of preset edge offset values each corresponding to a distance between a respective pixel and the respective edge and for storing at least one set of predetermined line portion parameters, said memory receiving said line portion parameters as an address and outputting out edge offset value corresponding to an estimated distance between one pixel and the respective edge in response to said address, said determining means providing a plurality of sets of position signals each set having at least one position signal representing the position of one respective edge, said determining means being operable to estimate the position of the respective edge by estimating a location on said portion of said respective line having a light intensity value approximately equal to a value halfway between said respective maximum and minimum light intensity levels, said location corresponding to the position of the respective edge, said determining means further including means for comparing said line portion parameters to said at least one set of stored predetermined line portion parameters, and wherein said memory means is operable to provide the preset edge offset value corresponding to an estimated distance between one pixel and the respective edge corresponding to said location as a position signal if said line portion parameters are equal to a set of said stored predetermined line portion parameters;

calculating means, responsive to said plurality of sets of position signals, for calculating a width of at least one ribbon or opening to obtain at least one calculated width, each calculated width corresponding to the distance between two adjacent edges; and defect determining means for determining whether said at least one calculated width falls outside a predetermined range of widths so as to providing an indication of a width defect.

27. Apparatus according to claim 26, wherein said calculating means includes selecting means for receiving said plurality of sets of said position signals from said determining means and for selecting the position signal from each of said sets corresponding to a respective minimum edge offset value.

28. Apparatus according to claim 27, wherein said calculating means is operable to calculate a difference between a plurality of pairs of selected position signals to form a plurality of calculated widths for each of the openings and ribbons.

29. Apparatus according to claim 28, wherein said calculating means further includes means for determining if each of said calculated widths falls outside a first predetermined range o widths and means for classifying each of said calculated widths as one of a calculated opening width and a calculated ribbon width and for selecting the calculated ribbon widths.

30. Apparatus according to claim 29, wherein said calculating means further includes averaging means for averaging said selected calculated ribbon widths to obtain an average ribbon width.

31. Apparatus according to claim 30, wherein said defect determining means is operable to determine whether said average ribbon width fails outside a second predetermined range of widths so as to indicate a defect.

* * * * *